(12) United States Patent
Taira et al.

(10) Patent No.: US 7,164,799 B2
(45) Date of Patent: Jan. 16, 2007

(54) INFORMATION RECORDING MEDIUM, INFORMATION RECORDING DEVICE, AND INFORMATION REPRODUCING METHOD

(75) Inventors: Kazuhiko Taira, Yokohama (JP); Teiichi Ichikawa, Yokohama (JP); Yumiko Taga, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/391,364

(22) Filed: Mar. 29, 2006

(65) Prior Publication Data

US 2006/0188232 A1 Aug. 24, 2006

Related U.S. Application Data

(63) Continuation of application No. PCT/JP05/16693, filed on Sep. 6, 2005.

(30) Foreign Application Priority Data

Sep. 7, 2004 (JP) .............................. 2004-260062

(51) Int. Cl.
*G06K 9/36* (2006.01)
*G06K 9/46* (2006.01)

(52) U.S. Cl. ...................... 382/232; 382/245; 382/274; 386/126

(58) Field of Classification Search ........ 382/232–233, 382/245–246, 274; 386/125, 126; 360/86, 360/97.01, 98.08, 99.05, 98.01
See application file for complete search history.

(56) References Cited

U.S. PATENT DOCUMENTS

| 5,999,696 A | * | 12/1999 | Tsuga et al. .................. 386/98 |
| 2004/0163116 A1 | | 8/2004 | Taira et al. |
| 2005/0201732 A1 | * | 9/2005 | Nonomura et al. ........... 386/95 |

FOREIGN PATENT DOCUMENTS

| JP | 8-242448 | 9/1996 |
| JP | 9-214955 | 8/1997 |
| JP | 2829266 | 9/1998 |
| JP | 11-168702 | 6/1999 |
| JP | 11-234697 | 8/1999 |
| JP | 2004-186808 | 7/2004 |

* cited by examiner

*Primary Examiner*—Matthew C. Bella
*Assistant Examiner*—Ali Bayat
(74) *Attorney, Agent, or Firm*—Oblon, Spivak, McClelland, Maier & Neustadt, P.C.

(57) ABSTRACT

According to one embodiment, an information recording medium includes a video object area for recording a video object formed of video object units which is a minimum unit for reproduction, and a highlight information pack which is included in the video object unit.

3 Claims, 19 Drawing Sheets

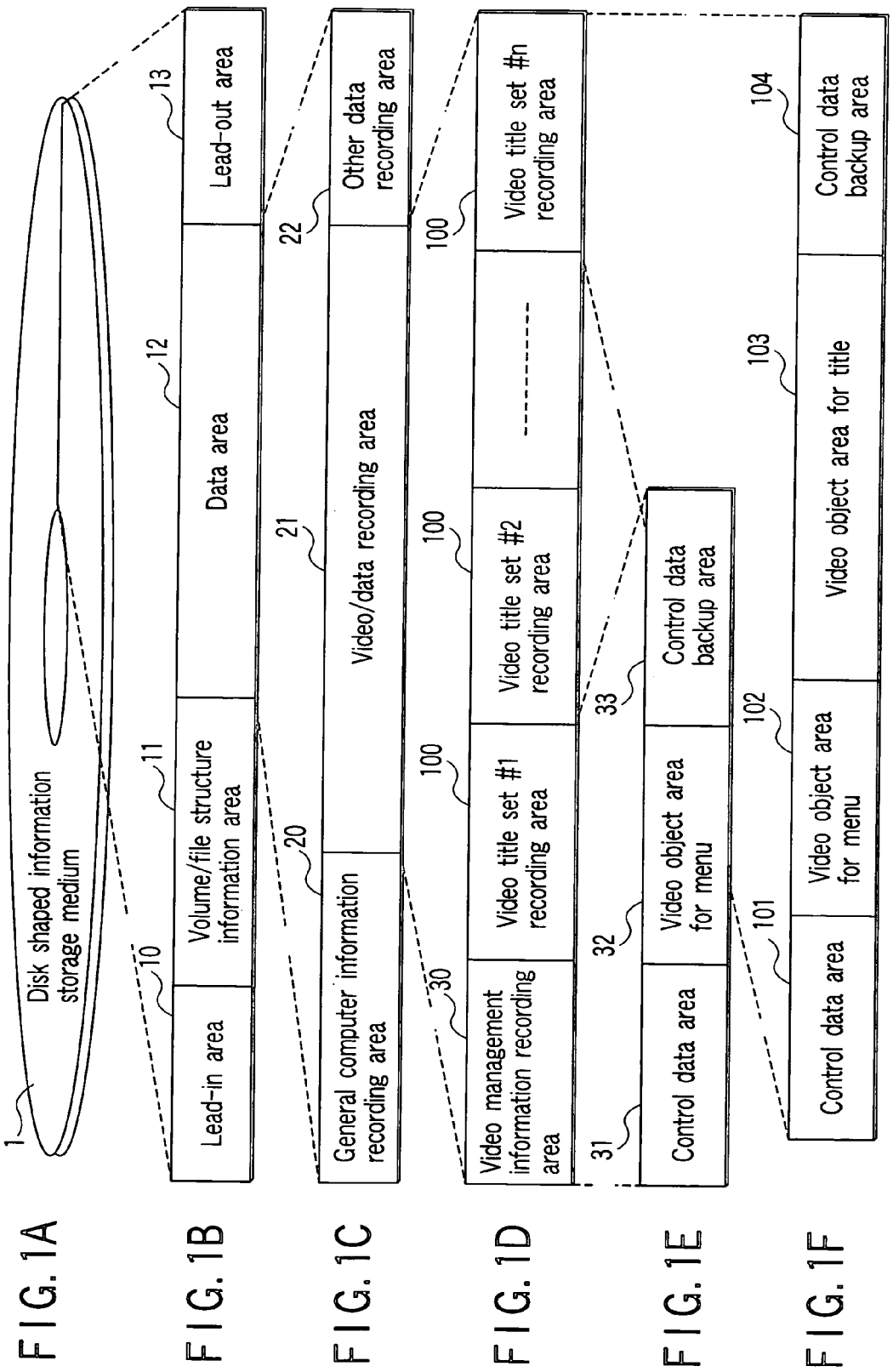

| Pixel name | Pixel data |
|---|---|
| Background | 00b |
| Character | 01b |
| Border 1 | 10b |
| Border 2 | 11b |

| Pixel name | Pixel data |
|---|---|
| Background | 000b |
| Character | 001b |
| Border 1 | 010b |
| Border 2 | 011b |

| Pixel name | Pixel data |
|---|---|
| Gradation 1 | 10000000b |
| Gradation 2 | 10000001b |
| : | : |
| Gradation 128 | 11111111b |

RLE compression of 8 bits/pixel (4+128 colors)

PIX#=000,001,010 or 011(Basic 4 colors)

(1) Number of continuous runs=1

| d0 | d1 | d2 | d3 |
|---|---|---|---|
| COMP =0 | PIX2 =0 | PIX1 | PIX0 |

(2) 2≦number of continuous runs≦9(number of continuous runs=RUN+2)

| d0 | d1 | d2 | d3 | d4 | d5 | d6 | d7 |
|---|---|---|---|---|---|---|---|
| COMP =1 | PIX2 =0 | PIX1 | PIX0 | LEXT =0 | RUN2 | RUN1 | RUN0 |

(3) 10≦number of continuous runs≦136(number of continuous runs=RUN+9)

| d0 | d1 | d2 | d3 | d4 | d5 | d6 | d7 | d8 | d9 | d10 | d11 |
|---|---|---|---|---|---|---|---|---|---|---|---|
| COMP =1 | PIX2 =0 | PIX1 | PIX0 | LEXT =1 | RUN6 | RUN5 | RUN4 | RUN3 | RUN2 | RUN1 | RUN0 |

(4) To line terminal end(line terminal end code)

| d0 | d1 | d2 | d3 | d4 | d5 | d6 | d7 | d8 | d9 | d10 | d11 |
|---|---|---|---|---|---|---|---|---|---|---|---|
| COMP =1 | PIX2 =1 | PIX1 | PIX0 | LEXT =1 | RUN6 =0 | RUN5 =0 | RUN4 =0 | RUN3 =0 | RUN2 =0 | RUN1 =0 | RUN0 =0 |

RLE compression of 8 bits/pixel (4+128 colors)

PIX# = 10000000 to 11111111 (Other 128 colors)

(5) Number of continuous runs=1

| d0 | d1 | d2 | d3 | d4 | d5 | d6 | d7 | d8 |
|---|---|---|---|---|---|---|---|---|
| COMP | PIX7 | PIX6 | PIX5 | PIX4 | PIX3 | PIX2 | PIX1 | PIX0 |
| =0 | | | | | | | | |

(6) 2≦number of continuous runs≦9 (number of continuous runs=RUN+2)

| d0 | d1 | d2 | d3 | d4 | d5 | d6 | d7 | d8 | d9 | d10 | d11 | d12 |
|---|---|---|---|---|---|---|---|---|---|---|---|---|
| COMP | PIX7 | PIX6 | PIX5 | PIX4 | PIX3 | PIX2 | PIX1 | PIX0 | LEXT | RUN2 | RUN1 | RUN0 |
| =1 | | | | | | | | | =0 | | | |

(7) 10≦number of continuous runs≦136 (number of continuous runs=RUN+9)

| d0 | d1 | d2 | d3 | d4 | d5 | d6 | d7 | d8 | d9 | d10 | d11 | d12 | d13 | d14 | d15 | d16 |
|---|---|---|---|---|---|---|---|---|---|---|---|---|---|---|---|---|
| COMP | PIX7 | PIX6 | PIX5 | PIX4 | PIX3 | PIX2 | PIX1 | PIX0 | LEXT | RUN6 | RUN5 | RUN4 | RUN3 | RUN2 | RUN1 | RUN0 |
| =1 | | | | | | | | | =1 | | | | | | | |

(8) To line terminal end (line terminal end code)

| d0 | d1 | d2 | d3 | d4 | d5 | d6 | d7 | d8 | d9 | d10 | d11 | d12 | d13 | d14 | d15 | d16 |
|---|---|---|---|---|---|---|---|---|---|---|---|---|---|---|---|---|
| COMP | PIX7 | PIX6 | PIX5 | PIX4 | PIX3 | PIX2 | PIX1 | PIX0 | LEXT | RUN6 | RUN5 | RUN4 | RUN3 | RUN2 | RUN1 | RUN0 |
| =1 | | | | | | | | | =1 | =0 | =0 | =0 | =0 | =0 | =0 | =0 |

RLE compression of n bits/pixel($4+2^{(n-1)}$ colors)

PIX#=000,001,010 or 011(Basic 4 colors)

| | (A) | (B) | | | (C) | (D) | | (E) | |
|---|---|---|---|---|---|---|---|---|---|
| | d0 | d1 | d2 | d3 | d4 | d5 | ... | d(p+4) | d(p+5) ... d(p+q+4) |
| (1) Number of continuous runs=1 | COMP =0 | PIX2 | PIX1 | PIX0 | | | | | |
| (2) $2 \leq$ number of continuous runs $\leq 2^p+1$ Number of continuous runs=RUN+2 | COMP =1 | PIX2 =0 | PIX1 | PIX0 | LEXT =0 | RUN p-1 | ... | RUN 0 | |
| (3) $2^p+2 \leq$ number of continuous runs $\leq 2^p(2^q+1)$ Number of continuous runs=RUN+($2^p$+1) | COMP =1 | PIX2 =0 | PIX1 | PIX0 | LEXT =1 | RUN p+q-1 | ... | RUN q | RUN q-1 ... RUN 0 |
| (4) To line terminal end (line terminal end code) | COMP =1 | PIX2 =0 | PIX1 | PIX0 | LEXT =1 | RUN =0 | ... | RUN =0 | RUN =0 ... RUN =0 | p bits (under D); (p+q) bits (under D+E)

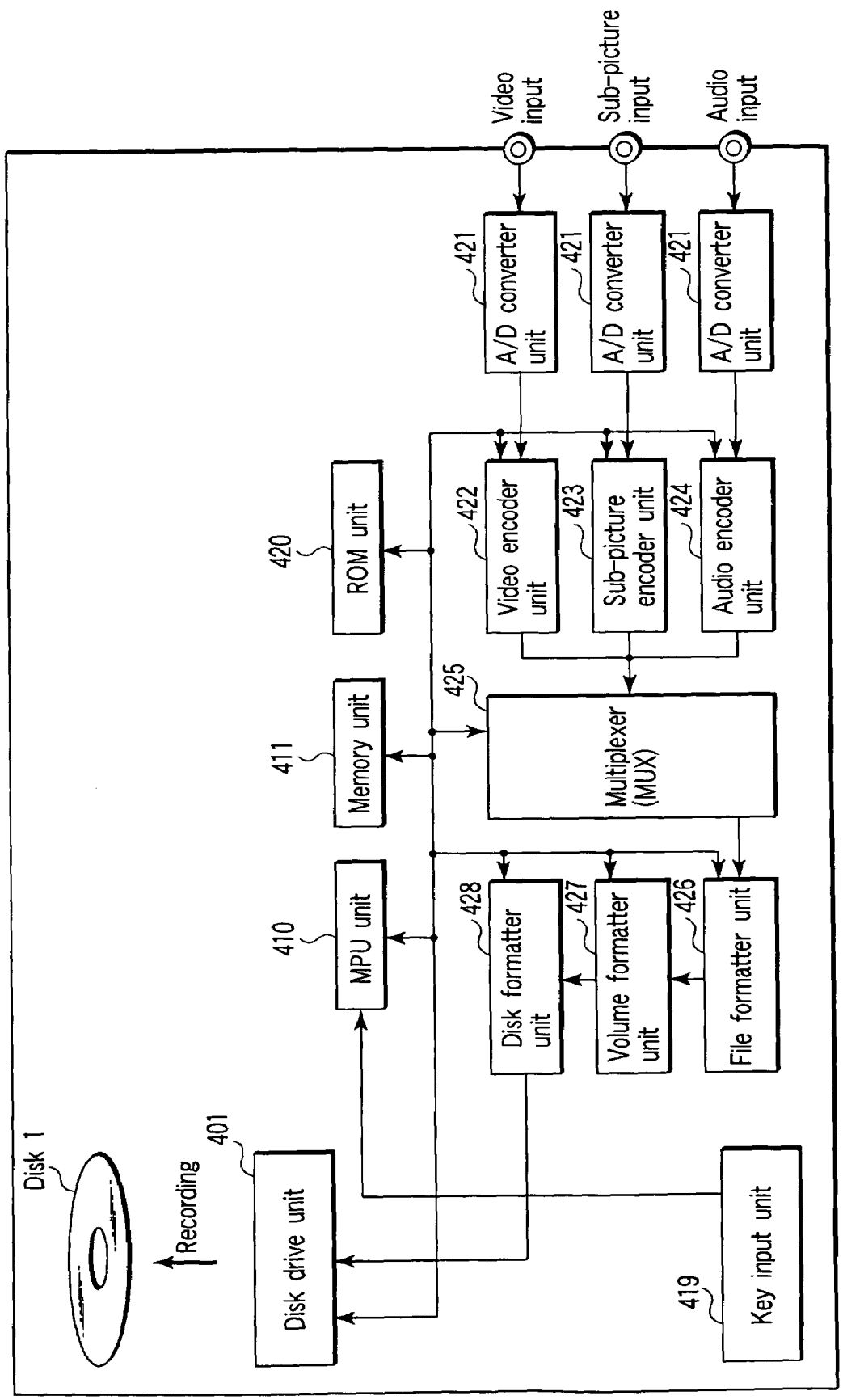
F I G. 16

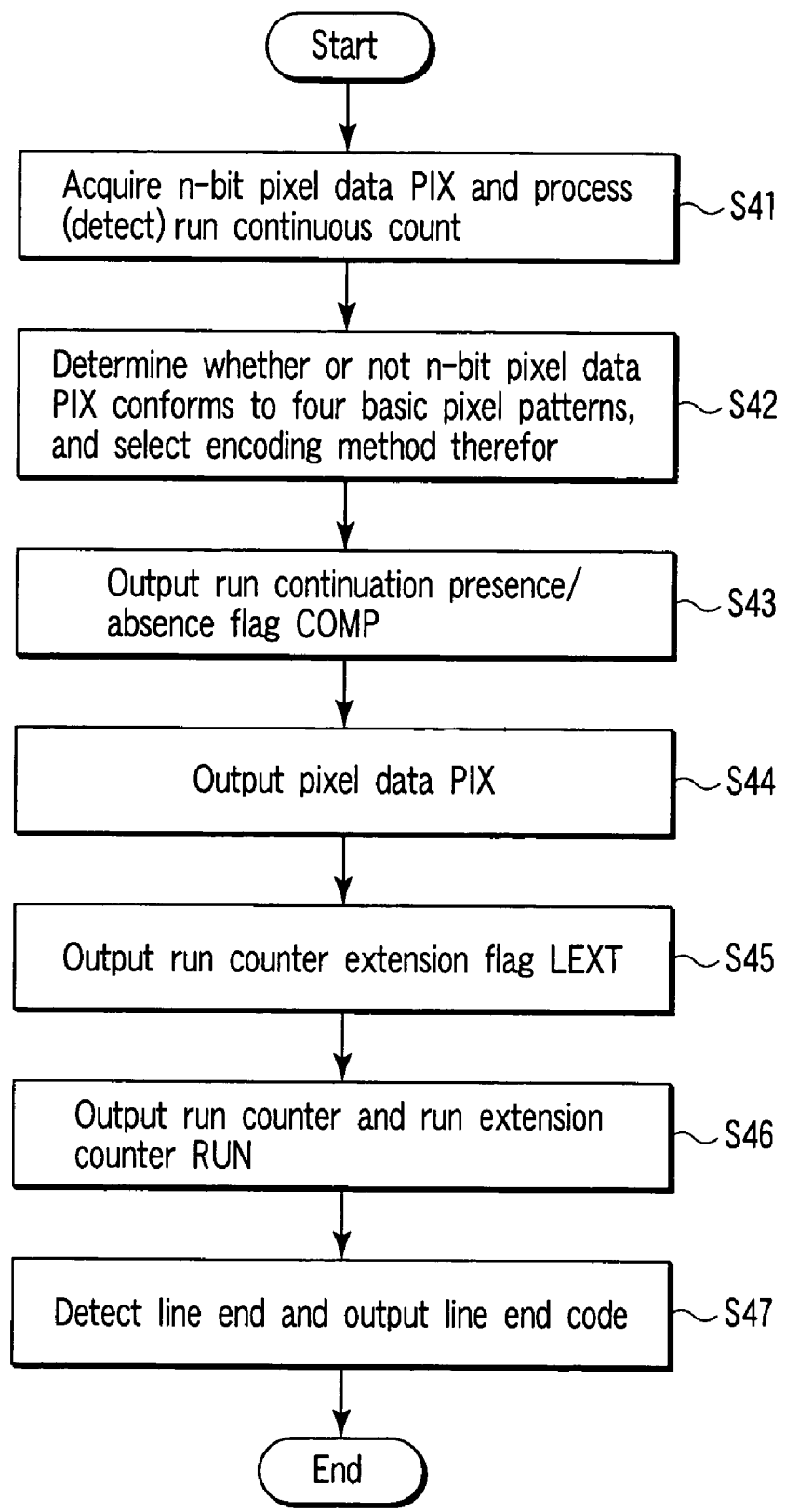
F I G. 17

INFORMATION RECORDING MEDIUM, INFORMATION RECORDING DEVICE, AND INFORMATION REPRODUCING METHOD

CROSS-REFERENCE TO RELATED APPLICATIONS

This is a Continuation Application of PCT Application No. PCT/JP2005/016693, filed Sep. 6, 2005, which was published under PCT Article 21(2) in English.

This application is based upon and claims the benefit of priority from prior Japanese Patent Application No. 2004-260062, filed Sep. 7, 2004, the entire contents of which are incorporated herein by reference.

BACKGROUND

1. Field

One embodiment of the present invention relates to an information recording device that records data of different purposes and kinds such as compressed motion picture data and audio data to an information recording medium (or information storage medium) such as an optical disk that records such data, an information reproducing method that reproduces data from the medium, and an information recording medium.

2. Description of the Related Art

In recent years, high picture quality and high performance DVDs (digital versatile disks) and DVD video players for reproducing the disks have spread widely, and there are many selections, including peripheral devices that reproduce the multi channel audio thereof, so that environments have been already prepared where home theater systems are available in private homes, and movies, animations and the like can be freely enjoyed there.

Further, in these several years, along the improvement of image compression technologies, and for realization of further higher picture quality, there is an increasing demand for recording high picture quality contents of high definition TV method (hereinafter, referred to simply as HD method) among contents developers. According to this trend, there is a demand for improvements in picture quality also in the expression performance of sub-picture information that has been used as subtitles and menu information.

As a conventional sub-picture information compression technology, there is known a sub-picture image data encoding/decoding system using a run length compression method in which image data of continuous sub-pictures are all replaced into a form of the continuous number of image data and one of the image data thereof, and thereby image data is compressed (for example, refer to Japanese Patent KOKAI Publication No. 8-242448 (paragraphs [0081] to [0101], and FIG. 5)).

For the sub-pictures as subtitles and menu information to high picture quality HD (high definition) contents, contents developers demand the expression performance of 16 colors or higher. However, the sub-pictures handled in the Japanese Patent KOKAI Publication No. 8-242448 are of 2 bits/pixel expression (4 colors) for the conventional SD (standard definition) TV method (hereinafter, referred to simply as SD method). Accordingly, the expression performance thereof is poor for the use as subtitles and menu information in high picture quality HD contents, and a run length compression method of 4 bits/pixel expression (16 colors) is proposed (for example, refer to Japanese Patent KOKAI Publication No. 2004-186808 (paragraphs [0045] to [0047], and FIG. 7)).

However, even with the 4 bits/pixel expression (16 colors) disclosed in the Japanese Patent KOKAI Publication No. 2004-186808, jagged portions appear conspicuous around displayed subtitle characters in some backgrounds (bright portions) of a high definition main picture, which deteriorates high picture quality contents.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIGS. 1A, 1B, 1C, 1D, 1E and 1F are exemplary s showing a data structure of an information storage medium according to an embodiment of the present invention;

FIG. 6 is an exemplary diagram showing the compression rule of run length compression of basic pixel patterns in the case of 8 bits/pixel;

FIG. 7 is an exemplary diagram showing the compression rule of run length compression of 128 patterns other than the basic pixel patterns in the case of 8 bits/pixel;

FIG. 8 is an exemplary diagram showing the compression rule of run length compression of basic pixel patterns in the case of n bits/pixel;

FIG. 9 is an exemplary diagram showing the compression rule of run length compression of 128 patterns other than the basic pixel patterns in the case of n bits/pixel;

FIG. 16 is an exemplary block diagram showing an information recording device according to the embodiment of the present invention;

FIG. 17 is an exemplary flow chart showing basic processes of run length compression;

DETAILED DESCRIPTION

Figures 2A, 2B, 2C, 2D:
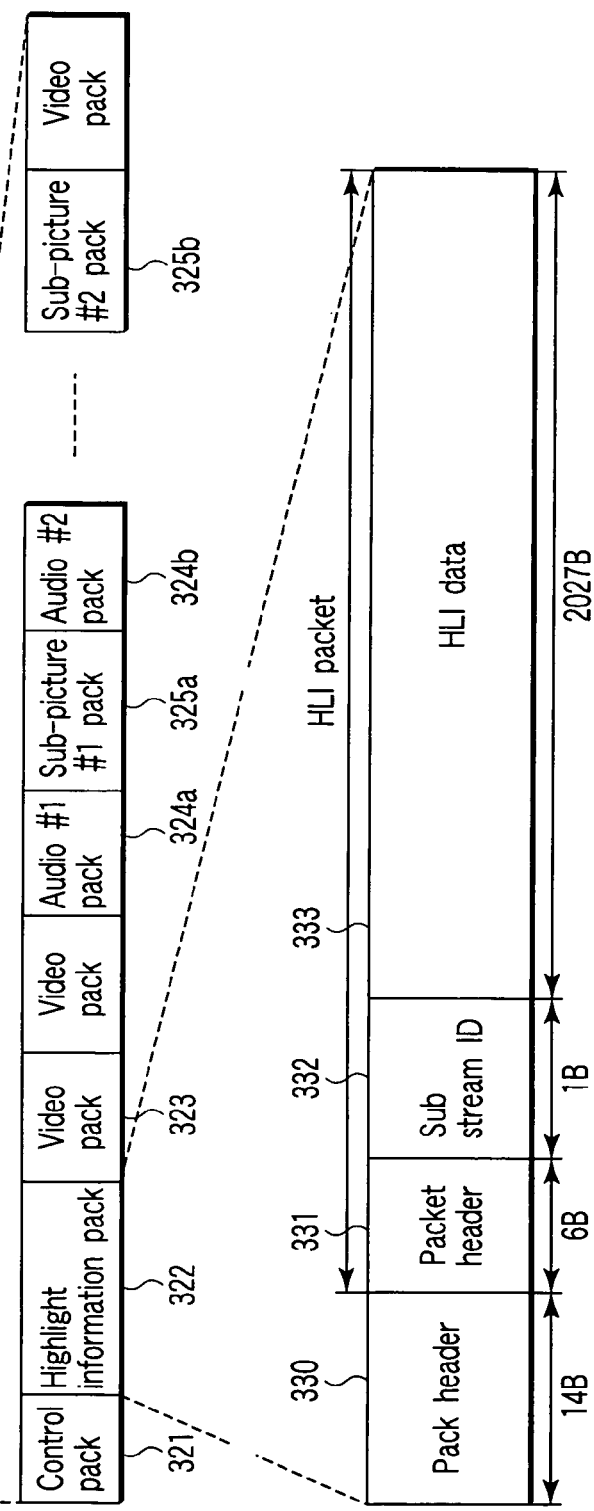
FIGS. 2A, 2B, 2C and 2D are exemplary diagrams showing details of a video object which is stored in a video object area in FIGS. 1E and 1F.

Various embodiments according to the invention will be described hereinafter with reference to the accompanying drawings. In general, according to one embodiment of the invention, an information recording medium comprises a video object area for recording a video object formed of video object units which is a minimum unit for reproduction, and a highlight information pack which is included in the video object unit.

Before the explanation of embodiments, principles of the present invention will be explained hereinafter. When an expression of not less than 4 bits per pixel (16 colors or more) is adopted in the method described in Japanese Patent KOKAI Publication No. 2004-186808, there occurs a problem where the probability of run continuation (for example, 01b→01b) decreases as the number of bits increases, the run length cannot be made long, and the data size increases accordingly, so that the compression ratio declines. On the other hand, from the fact that the main applications of sub-pictures are subtitles in the requests for subtitles from contents developers, sub-pictures are limited to subtitle applications in the invention. In the expression of n bits/pixel (n=3 or higher) or higher, short bit lengths are allocated to four basic pixel patterns that appear frequently in subtitle applications, whereby the data size is restricted from increasing, and run length compression with a high compression ratio is realized in which run length can be made long enough even in 128 colors or more.

An n bits/pixel run length compression/expansion method according to the invention has the following points (1) to (4).

(1) The method has a run continuation presence/absence flag COMP which designates compression/non-compression according to whether runs continue or not.

(2) The method has a run counter extension flag LEXT which expands the bit length of a run continuous counter according to the number of continuous runs.

(3) The method has a line terminal end code which shows that, when runs continue to a line terminal end, development is made by continuous pixel patterns to the line terminal end.

(4) The method allocates short bit lengths to the following four basic pixel patterns that appear frequently in subtitle applications, and thereby improves the compression ratio.

1) Background (used as the background of subtitles, where runs continue most)

2) Characters (forming a character pattern, and becoming the basis of subtitles)

3) Border 1 (used for a character emphasis pattern, or character outlining)

4) Border 2 (same as the above)

The present invention, as shown in the above (4), matches the four basic pixel patterns that appear frequently with the basic pixel patterns defined by sub-pictures in 2 bits/pixel of the current SD method (gives an identical pattern name thereto), thereby enables to share the setting area of color and contrast information for menu selection by the SD method and the HD method. In other words, only highlight information of four basic pixel data defined by sub-pictures of the current 2 bits/pixel, and highlight information of four basic pixel patterns defined by sub-pictures of n bits/pixel become the objectives of color changes and contrast changes, and other pixel data are not the objectives of changes. Accordingly, in sub-pictures compressed by either of the methods, it is possible to unify switching of highlight information for menu selection, and to realize the unification of the processes thereof.

When button information (the number of commands) is increased, highlight information that has been conventionally included in a navigation pack cannot be stored in the navigation pack. Therefore, only highlight information is made into one pack, thereby improving data acquisition and highlight processing.

Hereinafter, embodiments of an information recording medium, an information recording device, an information reproducing device and an information reproducing method according to the invention will be explained in detail with reference to the accompanying drawings.

FIG. 1A shows the external appearance of a disk shaped information storage medium 1 to be explained in this embodiment.

The information storage medium 1, as shown in FIG. 1B, has a lead-in area 10, a volume/file structure information area 11, a data area 12 and a lead-out area 13, from the inner circumference side thereof.

Among these areas, the data area 12, as shown in FIG. 1C, comprises a general computer information recording area 20, a video/data recording area 21 and an other data recording area 22.

The video/data recording area 21, as shown in FIG. 1D, has a video management information recording area 30 that controls the entire information recorded in the information storage medium 1, and one or more video title set #n recording areas 100 that control information per title.

The video management information recording area 30, as shown in FIG. 1E, comprises a control data area 31, a video object area for menu 32 and a control data backup area 33.

The video title set #n recording area 100, as shown in FIG. 1F, has a control data area 101, a video object area for menu 102, a video object area for title 103 and a control data backup area 104.

FIG. 2A shows a video object (VOB) 300, one or more of which are stored in the above video object areas 32, 102, and 103, respectively.

The video object (VOB) 300, as shown in FIG. 2B, comprises one or more video object units (VOBU) 310. The video object unit (VOBU) 310 is the minimum unit for reproduction.

The video object unit (VOBU) 310, as shown in FIG. 2C, comprises a control pack 321 at the start, a highlight information (HLI) pack 322 arranged just after the control pack 321, plural video packs 323, plural audio #1 pack 324a and audio #2 pack 324b that respectively configure selectable first and second audio streams, and plural sub-picture #1 pack 324a and sub-picture #2 pack 325b that respectively configure selectable first and second sub-picture streams.

The audio packs 324a and 324b of the selected first or second audio stream, and the sub-picture packs 325a and 325b of the selected first or second sub-picture stream are reproduced in synchronization with the video pack 323 in the video object unit (VOBU) 310.

Note that the arrangement of the video pack, the sub-picture #1 pack, the sub-picture #2 pack, the audio #1 pack, and the audio #2 pack in the video object unit (VOBU) 310 is not limited to the arrangement shown in FIG. 2C, but the arrangement thereof is arbitrary.

The highlight information pack 322, as shown in FIG. 2D, comprises a 14-byte pack header 330, a 6-byte packet header 331, a 1-byte sub stream ID 332 and a 2027-byte highlight information (HLI) data 333.

Figure 3:
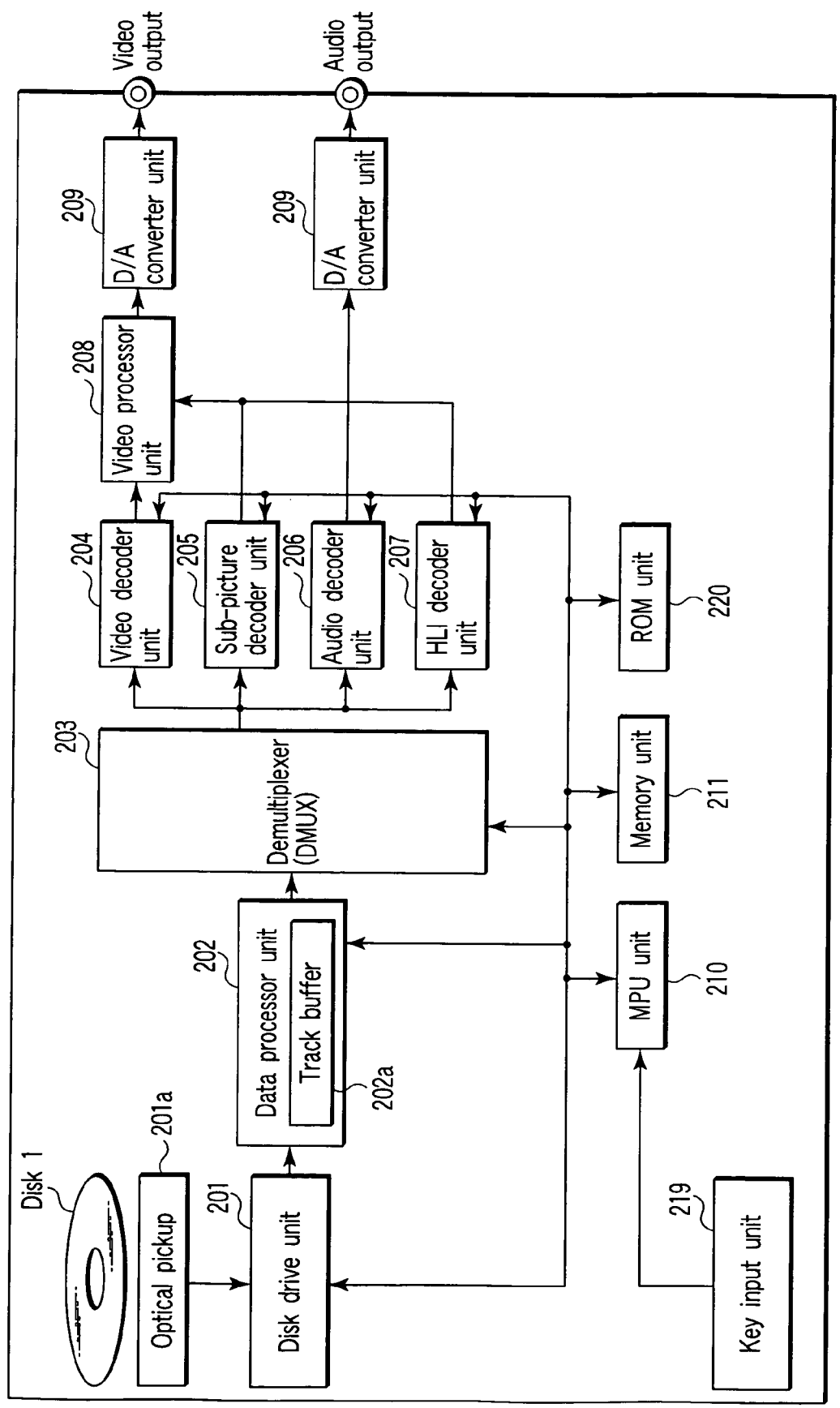
FIG. 3 is an exemplary block diagram showing an information reproducing device according to the embodiment of the invention.

FIG. 3 shows a reproducing device which reads information stored in the disk shaped information storage medium 1 and expands (reproduces) the information. The information storage medium 1 is mounted on a disk drive unit 201. The disk drive unit 201 rotates the information storage medium 1 mounted thereon, and reads information stored in the information storage medium 1 by use of an optical pickup 201a.

The information read by the disk drive unit 201 is supplied to a data processor unit 202, where error correction processing is performed, and then the information is stored in a track buffer 202a. Among the information stored in the track buffer 202a, management information of the control data areas 31 and 101 is stored in a memory unit 211, and used for reproduction control, data management and the like.

Among the information stored in the track buffer 202a, the information of the video object areas 32, 102 and 103 are transferred to a demultiplexer (DMUX) 203, and separated for the highlight information pack 322, the video pack 323, the audio #1 pack 324a, the audio #2 pack 324b, the sub-picture #1 pack 325a, and the sub-picture #2 pack 325b.

The information of the video pack 323 is supplied to a video decoder unit 204, the information of the audio #1 pack 324a and the audio #2 pack 324b is supplied to an audio decoder unit 206, the information of the sub-picture #1 pack 325a and the sub-picture #2 pack 325b is supplied to a sub-picture decoder unit 205, and the information of the highlight information pack 322 is supplied to a highlight (HLI) decoder unit 207, respectively, and decoding processing is performed.

The video information decoded by the video decoder unit 204, and the sub-picture information decoded by the sub-picture decoder unit 205 are supplied to a video processor unit 208 where synthesis processing is performed, and then the information are analogized by a digital/analogue (D/A) converter unit 209, and output as video signals to a video display device (not shown) (for example, a cathode ray tube (CRT) or the like).

Further, in the case with highlight information, the highlight information processed by the highlight (HLI) decoder unit 207 is synthesized with video information and sub-picture information by the video processor unit 208.

Figure 4:
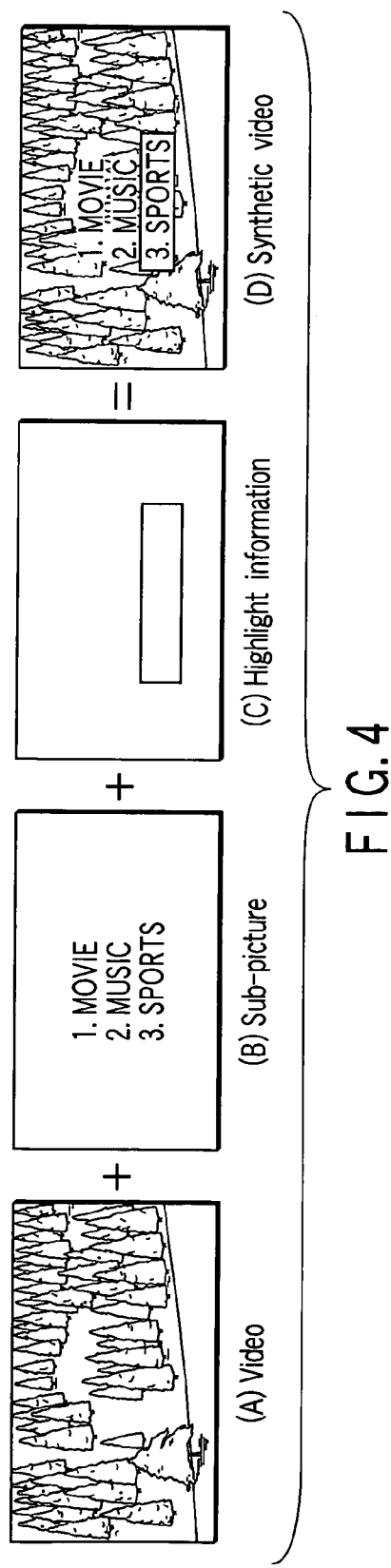
FIG. 4 is an exemplary schematic diagram showing a synthesis display of highlight information, video information and a sub-picture.

FIG. 4 schematically shows a synthesis display of these items of information. To (A) video, (B) sub-picture as a menu and (C) highlight information showing a menu button are overlapped, and (D) synthetic video is obtained.

The audio information decoded by the audio decoder unit 206 is analogized by the D/A converter unit 209, and is output as audio signals to an audio reproducing device (not shown) (for example, a loudspeaker or the like).

Such a series of reproducing operations to the information storage medium 1 are integrally controlled by an micro processing unit (MPU) unit 210. The MPU unit 210 receives operation information from a key input unit 219, and controls the respective units 201 to 208 on the basis of a program stored in a read only memory (ROM) unit 220.

Figures 5A, 5B, 5C:
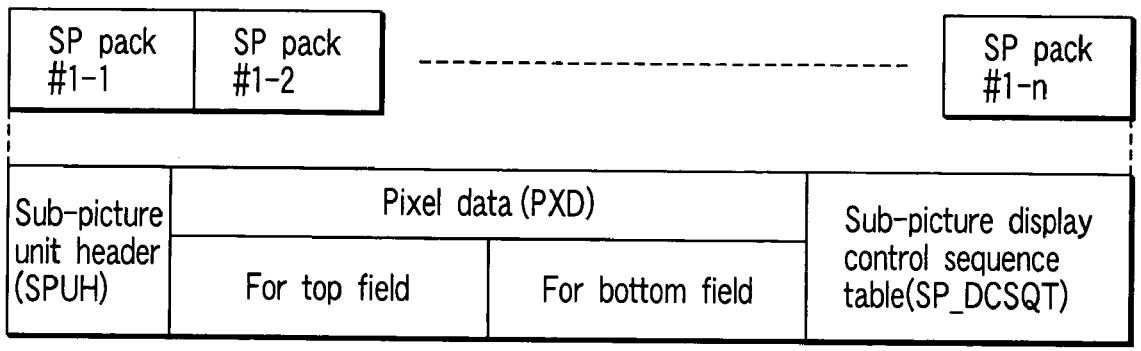
FIGS. 5A, 5B and 5C are exemplary diagrams showing the allocation of pixel data.

FIG. 5A shows the kinds of pixel data of 4 colors in the 2 bits/pixel run length compression method used in the prior art of the SD method described in the Japanese Patent KOKAI Publication No. 8-242448. A pixel name "background" is allocated to pixel data 00b, a pixel name "character" is allocated to 01b, a pixel name "border 1" is allocated to 10b, and a pixel name "border 2" is allocated to 11b. These are called basic pixel patterns.

FIG. 5B shows a sub-picture unit (SPU) to be contained in the plural sub-picture #1 pack 325a and sub-picture #2 pack 325b shown in FIG. 2C. The sub-picture unit (SPU) is divided into an integer number of sub-picture packs, and recorded onto the disk. Only the last sub-picture pack in one sub-picture unit (SPU) may have a padding packet or a stuffing byte. When the length of a sub-picture pack including the last data of the sub-picture unit (SPU) is less than 2,048 bytes, the length is adjusted. Other sub-picture packs than the last pack cannot have the padding packet.

The sub-picture unit (SPU) comprises a sub-picture unit header (SPUH), pixel data (PXD) and a sub-picture display control sequence table (SP_DCSQT). Run length compressed pixel data is compressed per line, and stored for top field and bottom field, respectively.

FIG. 5C shows an example of pixel data allocation in n bits/pixel run length compression method. In the same manner as the four basic pixel patterns in the conventional 2 bits/pixel compression method, the pixel data has background (000b), character (001b), border 1 (010b) and border 2 (011b) pixels. Further, besides the basic pixel patterns, the pixel data has 128-color gradation 1 (10000000b) pixel to gradation 128 (11111111b) pixel for antialias processing and gray scale processing.

FIGS. 6 and 7 show an example of a run length compression expansion method for sub-picture image data in the embodiment.

As shown in FIG. 5C, the background pixel, character pixel, border 1 pixel and border 2 pixel, as the basic pixel patterns of the conventional 2 bits/pixel compression method, are factors to configure subtitle characters. When the application of sub-pictures is specialized only to subtitle characters, the appearance frequency of these four basic pixel patterns becomes extremely high, in comparison with other patterns. Therefore, short bit lengths are allocated to these four basic pixel patterns that appear frequently, thereby a high compression ratio can be realized.

The compression rules are divided into ones at the basic pixel patterns, and ones at other gradation pixel patterns, and depending upon the continuous number of runs, there are four rules for the respective cases, namely there are eight rules in total.

FIG. 6 shows the compression rules (1) to (4) of the basic pixel patterns, and FIG. 7 shows the compression rules (5) to (8) of other 128 patterns than the basic pixel patterns.

Whether the compression rules of the basic pixel patterns are used, or the compression rules of other patterns than the basic pixel rules are used, is determined by checking the most significant bit of pixel data PIX following the 1-bit run continuation presence/absence flag COMP at the start. Specifically, if it is 0, it is determined that the compression rules of the basic pixel patterns are used, and if it is 1, it is determined that the compression rules of other patterns than the basic pixel rules are used.

The embodiment shows an example of 8 bits/pixel, meanwhile, FIG. 6 shows the run length compression rules in the case where 3 bits length is allocated to the four basic pixel patterns described above. The basic data structure comprises a 1-bit run continuation presence/absence flag COMP showing the presence or absence of run continuation (showing the presence or absence of compression), a 3-bit pixel data PIX showing pixel data (in the basic pixel patterns, the most significant bit PIX2 is 0), a 1-bit run counter extension flag LEXT showing the presence or absence of counter extension when the run continuation presence/absence flag COMP is 1 (present), a 3-bit run counter RUN of continuous runs, and a 4-bit run counter added to the 3-bit run counter RUN when the run counter extension flag LEXT is 1 (present).

(1) When the number of continuous runs is 1 (namely, when there is no run continuation):

The basic data comprises the 1-bit run compression presence/absence flag COMP (=0) at the start, and the 3-bit pixel data PIX following thereto (PIX2 being 0).

(2) When the number of continuous runs is 2 to 9:

The basic data comprises the 1-bit run compression presence/absence flag COMP (=1) at the start, the 3-bit pixel data PIX following thereto (PIX2 being 0), the run counter extension presence/absence flag LEXT (=0) following thereto, and the 3-bit run counter RUN following thereto. In this case, there is a condition that the number of continuous runs should become the value of the run counter RUN plus 2.

(3) When the number of continuous runs is 10 to 136:

The basic data comprises the 1-bit run compression presence/absence flag COMP (=1) at the start, the 3-bit pixel data PIX following thereto (PIX2=0 ), the run counter extension presence/absence flag LEXT (=1) following thereto, and the (3+4)-bit run counter RUN following thereto. In this case, there is a condition that the number of continuous runs should become the value of the run counter RUN plus 9.

(4) When the number of continuous runs continues to the line terminal end: (line terminal end code)

The basic data comprises the 1-bit run compression presence/absence flag COMP (=1) at the start, the 3-bit pixel data PIX following thereto (PIX2 being 0), the run counter extension presence/absence flag LEXT (=1) following thereto, and the (3+4)-bit run counter RUN (all 0) following thereto.

FIG. 7 shows the run length compression rules (5) to (8) in the case of compressing other 128-color gradation pixel patterns than the four basic pixel patterns of FIG. 5C. The basic data structure comprises a 1-bit run continuation presence/absence flag COMP showing the presence or absence of run continuation (showing the presence or absence of compression), an 8-bit pixel data PIX showing pixel data (in the gradation pixel patterns, the most significant bit PIX7 is 1), a 1-bit run counter extension flag LEXT showing the presence or absence of counter extension when the run continuation presence/absence flag COMP is 1 (present), a 3-bit run counter RUN of continuous runs, and a 4-bit run counter added to the 3-bit run counter RUN when the run counter extension flag LEXT is 1 (present).

(5) When the number of continuous runs is 1 (namely, when there is no run continuation):

The basic data comprises the 1-bit run compression presence/absence flag COMP (=0) at the start, and the 8-bit pixel data PIX following thereto (PIX7 being 1).

(6) When the number of continuous runs is 2 to 9:

The basic data comprises the 1-bit run compression presence/absence flag COMP (=1) at the start, the 8-bit pixel data PIX following thereto (PIX7 being 1), the run counter extension presence/absence flag LEXT (=0) following thereto, and the 3-bit run counter RUN following thereto. In this case, there is a condition that the number of continuous runs should become the value of the run counter RUN plus 2.

(7) When the number of continuous runs is 10 to 136:

The basic data comprises the 1-bit run compression presence/absence flag COMP (=1) at the start, the 8-bit pixel data PIX following thereto (PIX7 being 1), the run counter extension presence/absence flag LEXT (=1) following thereto, and the (3+4)-bit run counter RUN following thereto. In this case, there is a condition that the number of continuous runs should become the value of the run counter RUN plus 9.

(8) When the number of continuous runs continues to the line terminal end: (line terminal end code)

The basic data comprises the 1-bit run compression presence/absence flag COMP (=1) at the start, the 8-bit pixel data PIX following thereto (PIX7 being 1), the run counter extension presence/absence flag LEXT (=1) following thereto, and the (3+4)-bit run counter RUN (all 0) following thereto.

Figure 9:
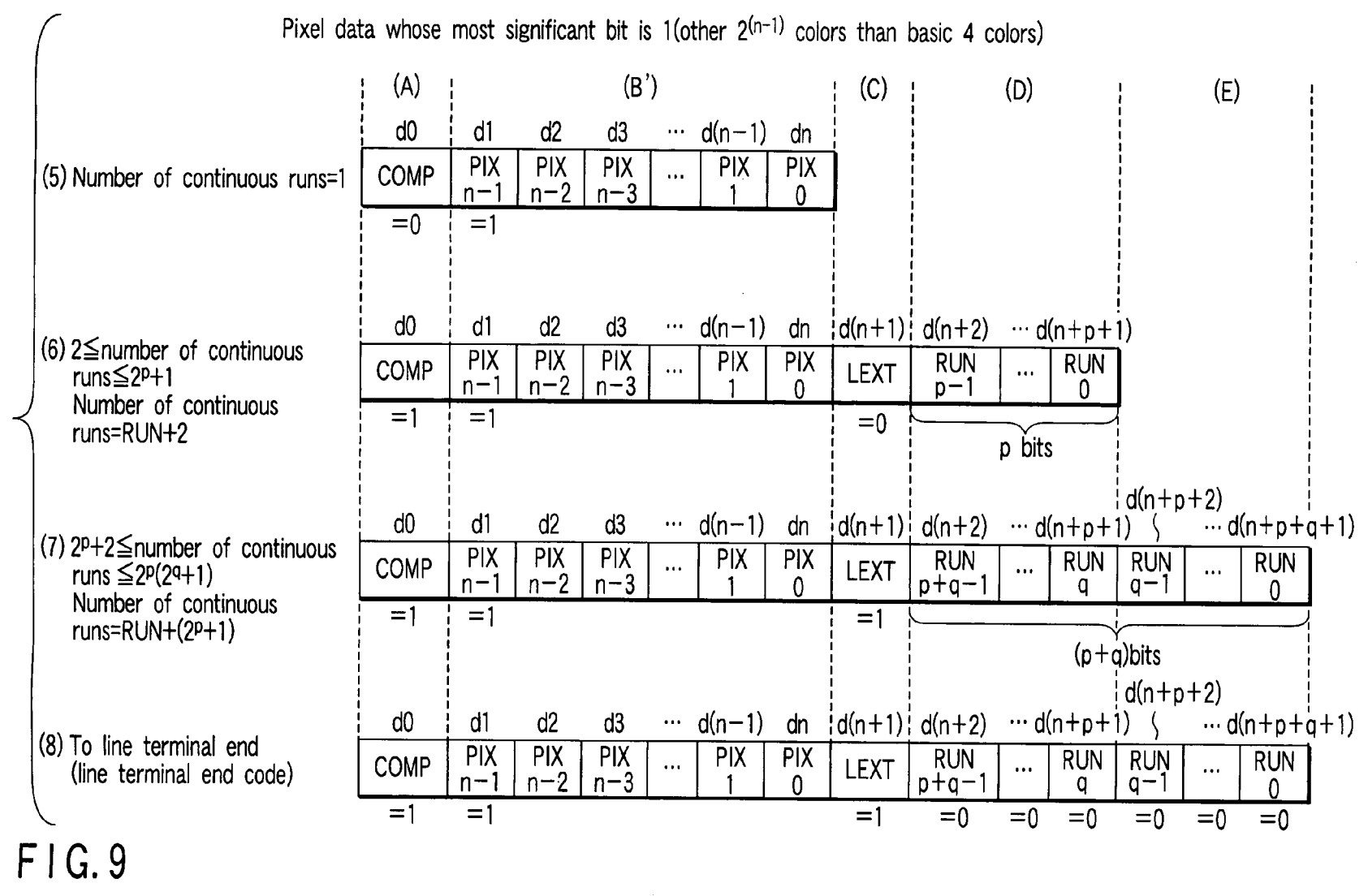

In FIGS. 6 and 7, examples of the run length compression rules of 8 bits/pixel are shown, meanwhile, the general run length compression rules of n bits/pixel are shown in FIGS. 8 and 9.

FIG. 8 shows the run length compression rules in the case where short bit lengths are allocated to the basic pixel patterns. The basic data comprises a 1-bit run compression presence/absence flag COMP showing the presence or absence of run continuation shown in column (A), a 3-bit pixel data PIX showing pixel data shown in column (B) (in the basic pixel patterns, the most significant bit PIX2 is 0), a 1-bit run counter extension flag LEXT showing the presence or absence of counter extension when the run continuation presence/absence flag COMP is 1 (present) shown in column (C), a p-bit run counter RUN of continuous runs shown in column (D), and a q-bit run counter added to the p-bit run counter RUN when the run counter extension flag LEXT is 1 (present) shown in column (E).

(1) When the number of continuous runs is 1 (namely, when there is no run continuation):

The basic data comprises the 1-bit run compression presence/absence flag COMP (=0) at the start, and the 3-bit pixel data PIX following thereto (PIX2 being 0).

(2) When the number of continuous runs is 2 to $(2^p+1)$:

The basic data comprises the 1-bit run compression presence/absence flag COMP (=1) at the start, the 3-bit pixel data PIX following thereto (PIX2 being 0), the run counter extension presence/absence flag LEXT (=0) following thereto, and the p-bit run counter RUN following thereto. In this case, there is a condition that the number of continuous runs should become the value of the run counter RUN plus 2.

(3) When the number of continuous runs is $(2^p+2)$ to $2^p(2^q+1)$:

The basic data comprises the 1-bit run compression presence/absence flag COMP (=1) at the start, the 3-bit pixel data PIX following thereto (PIX2 being 0), the run counter extension presence/absence flag LEXT (=1) following thereto, and the (p+q)-bit run counter RUN following thereto. In this case, there is a condition that the number of continuous runs should become the value of the run counter RUN plus $(2^p+1)$.

(4) When the number of continuous runs continues to the line terminal end: (line terminal end code)

The basic data comprises the 1-bit run compression presence/absence flag COMP (=1) at the start, the 3-bit pixel data PIX following thereto (PIX2 being 0), the run counter extension presence/absence flag LEXT (=1) following thereto, and the (p+q)-bit run counter RUN (all 0) following thereto.

FIG. 9 shows the run length compression rules (5) to (8) in the case of compressing other $2^{(n-1)}$-color gradation pixel patterns than the four basic pixel patterns in FIG. 8. The basic data structure comprises a 1-bit run continuation presence/absence flag COMP showing the presence or absence of run continuation shown in column (A), an n-bit pixel data PIX showing pixel data shown in column (B') (in the gradation pixel patterns, the most significant bit PIX(n−1) is 1), a 1-bit run counter extension flag LEXT showing the presence or absence of counter extension when the run continuation presence/absence flag COMP is 1 (present) shown in column (C), a p-bit run counter RUN of continuous runs shown in column (D), and a q-bit run counter added to the p-bit run counter RUN when the run counter extension flag LEXT is 1 (present) shown in column (E).

(5) When the number of continuous runs is 1 (namely, when there is no run continuation):

The basic data comprises the 1-bit run compression presence/absence flag COMP (=0) at the start, and the n-bit pixel data PIX following thereto (PIX(n−1) being 1).

(6) When the number of continuous runs is 2 to ($2^p+1$):

The basic data comprises the 1-bit run compression presence/absence flag COMP (=1) at the start, the n-bit pixel data PIX following thereto (PIX(n−1) being 1), the run counter extension presence/absence flag LEXT (=0) following thereto, and the p-bit run counter RUN following thereto. In this case, there is a condition that the number of continuous runs should become the value of the run counter RUN plus 2.

(7) When the number of continuous runs is ($2^p+2$) to $2^p(2^q+1)$:

The basic data comprises the 1-bit run compression presence/absence flag COMP (=1) at the start, the n-bit pixel data PIX following thereto (PIX (n−1) being 1), the run counter extension presence/absence flag LEXT (=1) following thereto, and the (p+q)-bit run-counter RUN following thereto. In this case, there is a condition that the number of continuous runs should become the value of the run counter RUN plus ($2^p+1$).

(8) When the number of continuous runs continues to the line terminal end: (line terminal end code)

The basic data comprises the 1-bit run compression presence/absence flag COMP (=1) at the start, the n-bit pixel data PIX following thereto (PIX(n−1) being 1), the run counter extension presence/absence flag LEXT (=1) following thereto, and the (p+q)-bit run counter RUN (all 0) following thereto.

In FIGS. 8 and 9, the value of the (p+q)-bit run counter RUN of the line terminal end code has been set to 0 for all the bits. However, since it is enough that the value is distinguished from the actual counter value, all the bits may be 1. In this case, in the compression patterns (3) of FIG. 8 and (7) of FIG. 9, the condition changes into one that the continuous number of runs should be the run counter RUN plus ($2^p+2$).

Figure 10:
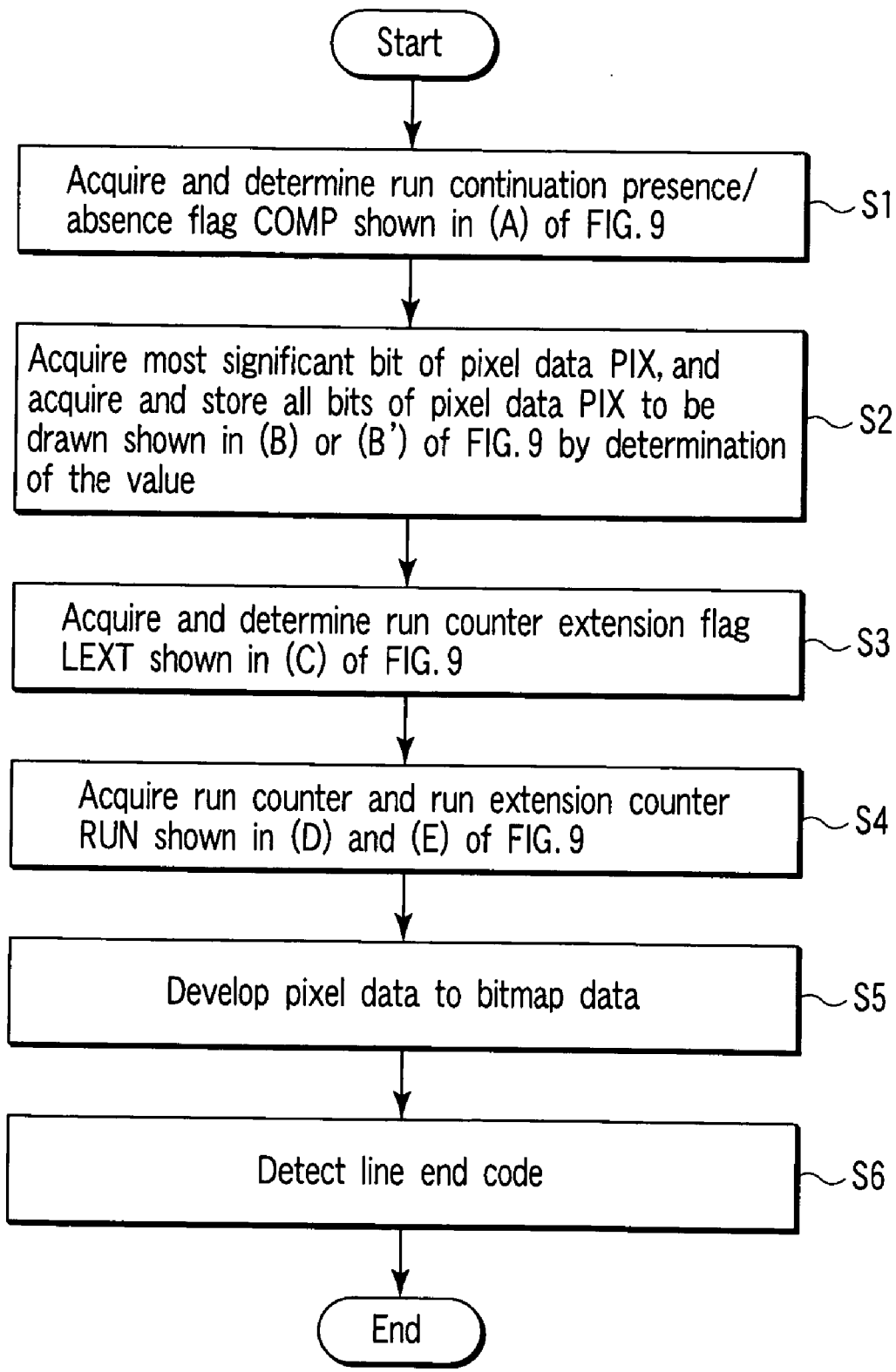
FIG. 10 is an exemplary flow chart showing basic processes of run length extension.

FIG. 10 shows a basic flow chart in the case of decoding (expanding) the compressed data in unit of line which is compressed by the run length compression rules of the present embodiment. As shown in FIG. 10, the basic flow of expansion includes the following processes.

Process of acquiring the run continuation presence/absence flag COMP shown in the column (A) and determining the flag (step S1).

Process of acquiring the most significant bit of the pixel data PIX, and acquiring and storing all the bits of the pixel data PIX to be drawn shown in the column (B) or (B') by the determination of the value (step S2).

Process of acquiring the run counter extension flag LEXT shown in the column (C) and determining the flag (step S3).

Process of acquiring the run counter and the run extension counter RUN shown in the columns (D) and (E) (step S4).

Process of developing the pixel data into bitmap (step S5).

Process of detecting the line end code (step S6).

Figure 11:
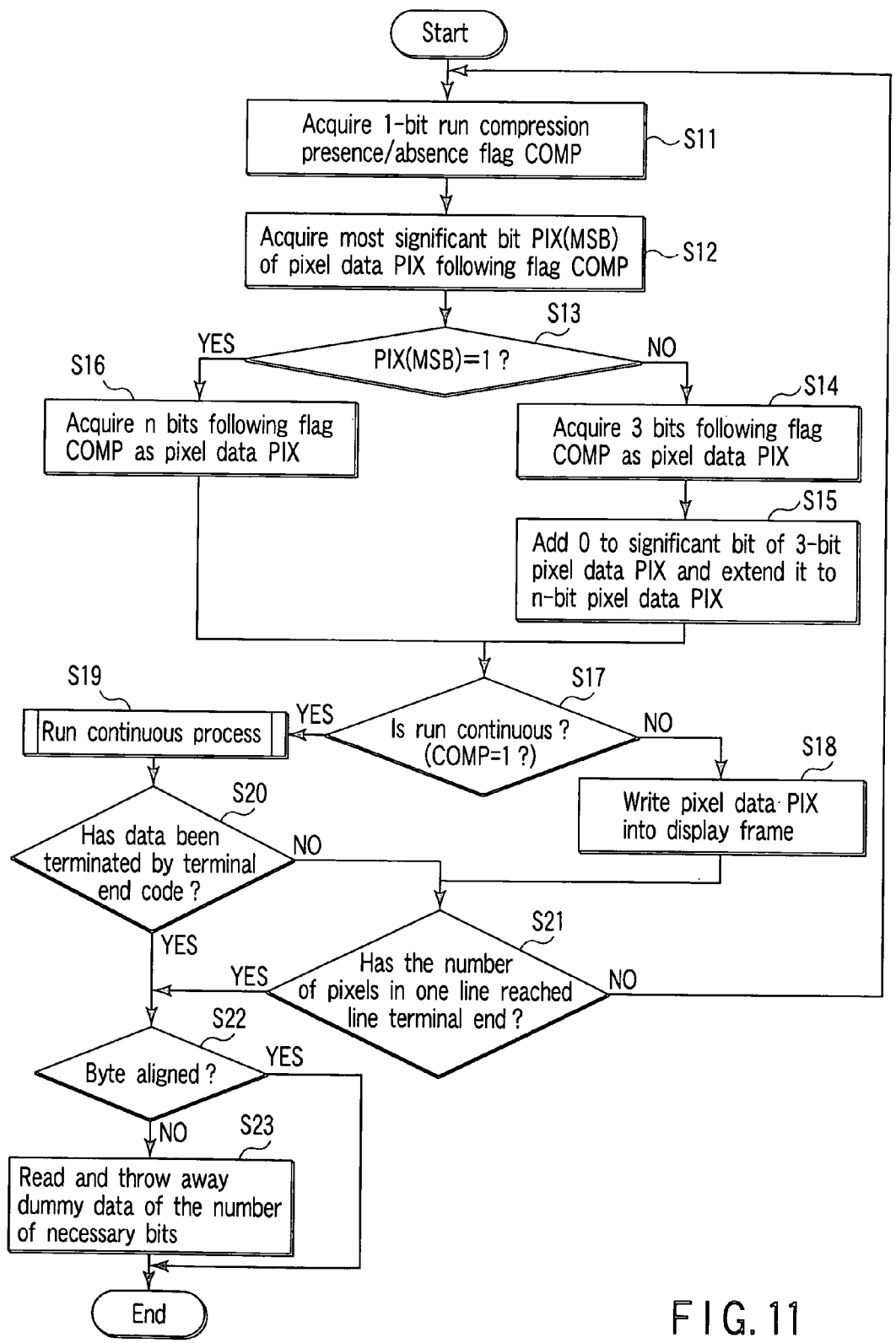
FIG. 11 is an exemplary flow chart showing detailed processes of run length extension.
Figure 12:
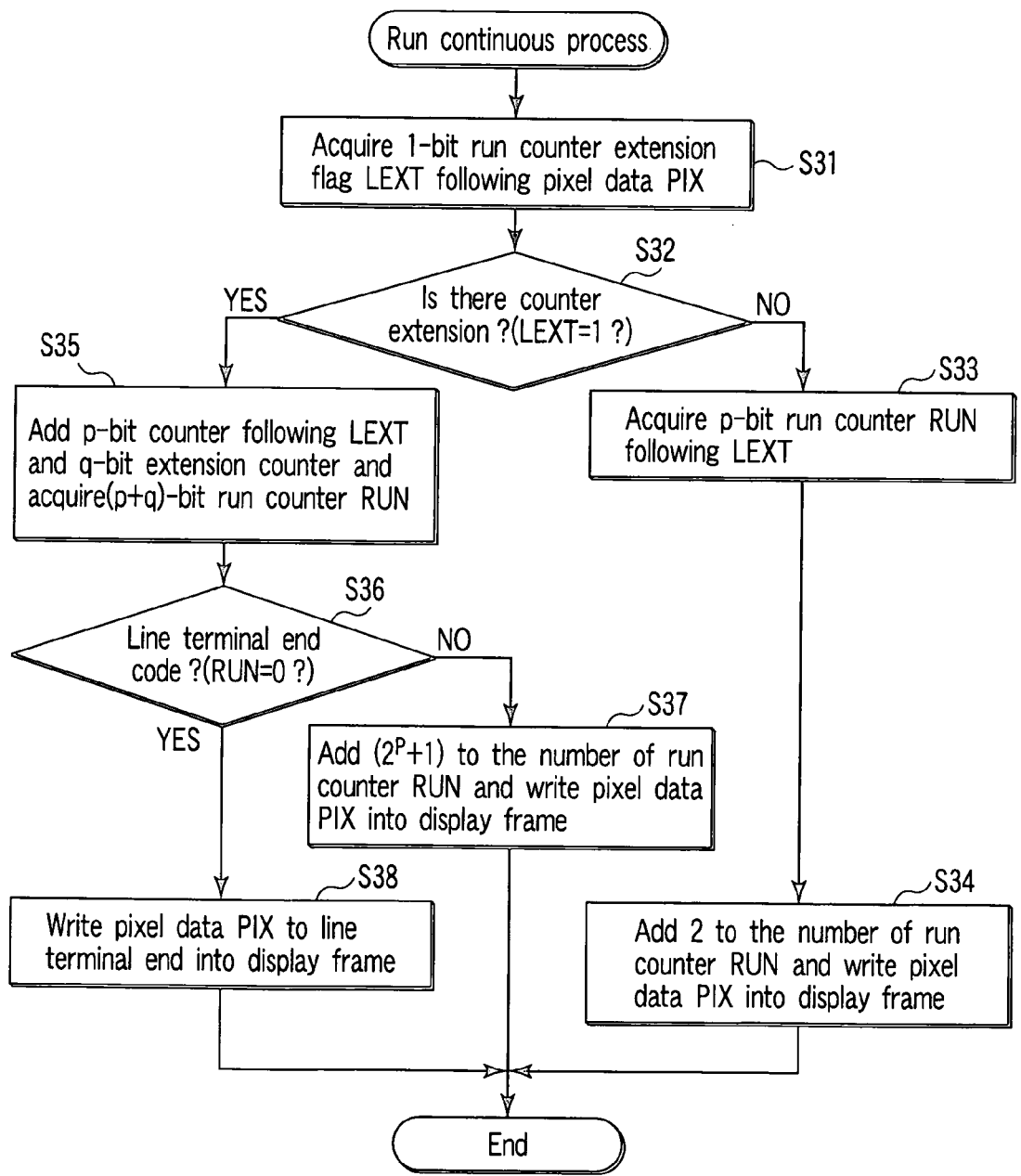
FIG. 12 is an exemplary flow chart showing detailed processes of run continuous process in FIG. 11.

FIGS. 11 and 12 show detailed flow charts of the expansion flow chart shown in FIG. 10.

FIG. 11 shows the main flow. As shown in FIG. 11, the following processes are carried out according to the run length compression rules of the invention shown in FIGS. 8 and 9.

The 1-bit run compression presence/absence flag COMP at the head of data is acquired (step S11).

The most significant bit (MSB) of the pixel data PIX following the COMP flag is acquired (step S12).

The value of the most significant bit (MSB) of the pixel data PIX (in the case of 0, the compression rules in the basic pixel patterns are applied, and in the case of 1, the compression rules in other pixel patterns are applied) is checked. It is determined whether or not the compression rules of other patterns than the basic pixel patterns are used (PIX (MSB)=1) (step S13).

If the determination result is false (NO) in step S13, the three bits following the COMP flag are acquired as the pixel data PIX (step S14).

(n−3)-bit 0 is added to the significant bit of the 3-bit pixel data PIX to expand it to an n-bit pixel data PIX (step S15).

If the determination result is true (YES) in step S13, n bits following the COMP flag are acquired as the pixel data PIX (step S16).

The value of the COMP flag (in the case of 0, there is no run continuation, and in the case of 1, there is run continuation, and the LEXT flag is added) is checked. It is determined whether or not there is run length compression (COMP=1) (step S17).

If the determination result is false (NO) in step S17, the n-bit pixel data PIX is written into the display frame as it is (step S18).

If the determination result is true (YES) in step S17, the run continuous process (run length compression process) is performed (step S19).

In the run continuous process in step S19, it is determined whether or not the data of one line has been terminated by the terminal end code (step S20).

If the determination result is false (NO) in step S20, it is determined whether or not the number of pixels in one line has reached the line terminal end (step S21). If it has not reached, the processes from step S11 are repeatedly performed.

If the determination result is true (YES) in step S20, or if the determination result is true (YES) in step S21, it is determined whether the data of one line has been byte aligned (step S22).

If the determination result is true (YES) in step S22, the decoding of the one line is completed.

If the determination result is false (NO) in step S22, dummy data of the number of necessary bits is read and thrown away, and the decoding of the one line is completed (step S23).

If there is a next line, the processes from step S11 are performed in the same manners.

FIG. 12 is a detailed flow of the run continuous process (step S19) that is performed in the main flow in FIG. 11.

As shown in FIG. 11, the following processes are performed according to the run length compression rules of the invention in FIGS. 8 and 9.

The 1-bit run counter extension flag LEXT following the pixel data PIX is acquired (step S31).

The value of the run counter extension flag LEXT (in the case of 0, there is no run counter extension, and in the case of 1, there is run counter extension, and a q-bit run counter is added) is checked. It is determined whether or not there is run counter extension (LEXT=1) (step S32).

If the determination result is false (NO) in step S32, the p-bit run counter RUN following the run counter extension flag LEXT is acquired (step S33).

The pixel data PIX, with 2 added to the number of the run counter RUN, is written into the display frame (step S34).

If the determination result is true (YES) in step S32, the p-bit counter following the run counter extension flag LEXT, and the q-bit extension counter are added, and the (p+q)-bit run counter RUN is acquired (step S35).

It is determined whether or not the value of the run counter RUN acquired in step S35 is all 0 (line terminal end code) (step S36).

If the determination result is false (NO) in step S36, the pixel data PIX, with ($2^p$+1) added to the number of the run counter RUN, is written into the display frame (step S37).

The pixel data PIX (to the line terminal end) is written into the display frame (step S38).

Figure 13:
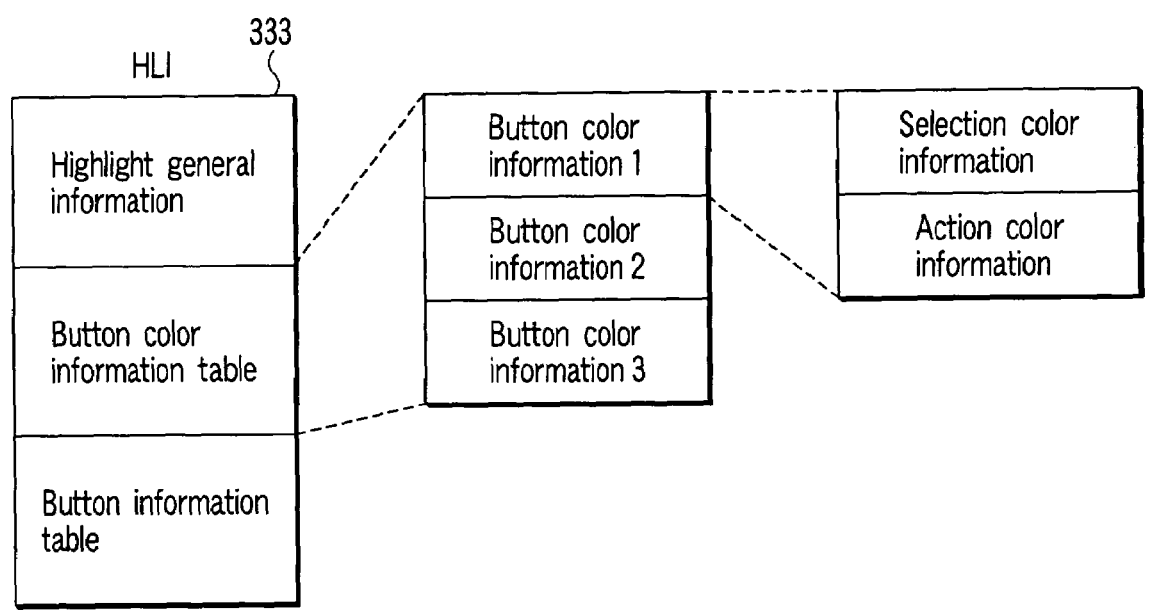
FIG. 13 is an exemplary diagram showing a data structure of a button color information table in highlight information.

FIG. 13 shows the contents of the highlight information (HLI) data 333 to be stored in the highlight information pack 322 shown in FIG. 2C.

FIG. 13 shows the data structure of the highlight information (HLI) 333. As shown in FIG. 13, the highlight information (HLI) 333 is roughly composed of highlight general information, a button color information table and a button information table.

The highlight general information includes flags showing highlight information statuses such as whether or not there is highlight information, time information showing the start and end of highlight information, information showing the end time of a selection valid period of buttons in the menu screen, button mode information showing button groups, offset numbers of buttons in the menu screen expanding to plural pages, the number of buttons in the menu screen, the number of numeric selection buttons selectable by numeric keys on a remote controller, forced selection button numbers for forcibly designating a selection button at the start of menu screen display, and forced decision button numbers for forcibly designating a decision button at the moment of reach to the menu selection valid period.

The button color information table comprises three button color information 1 to 3, and becomes the button color information of one of button groups divided into 1 to 3 by means of the button mode information. The button color information has selection color information and action color information.

Figure 14:
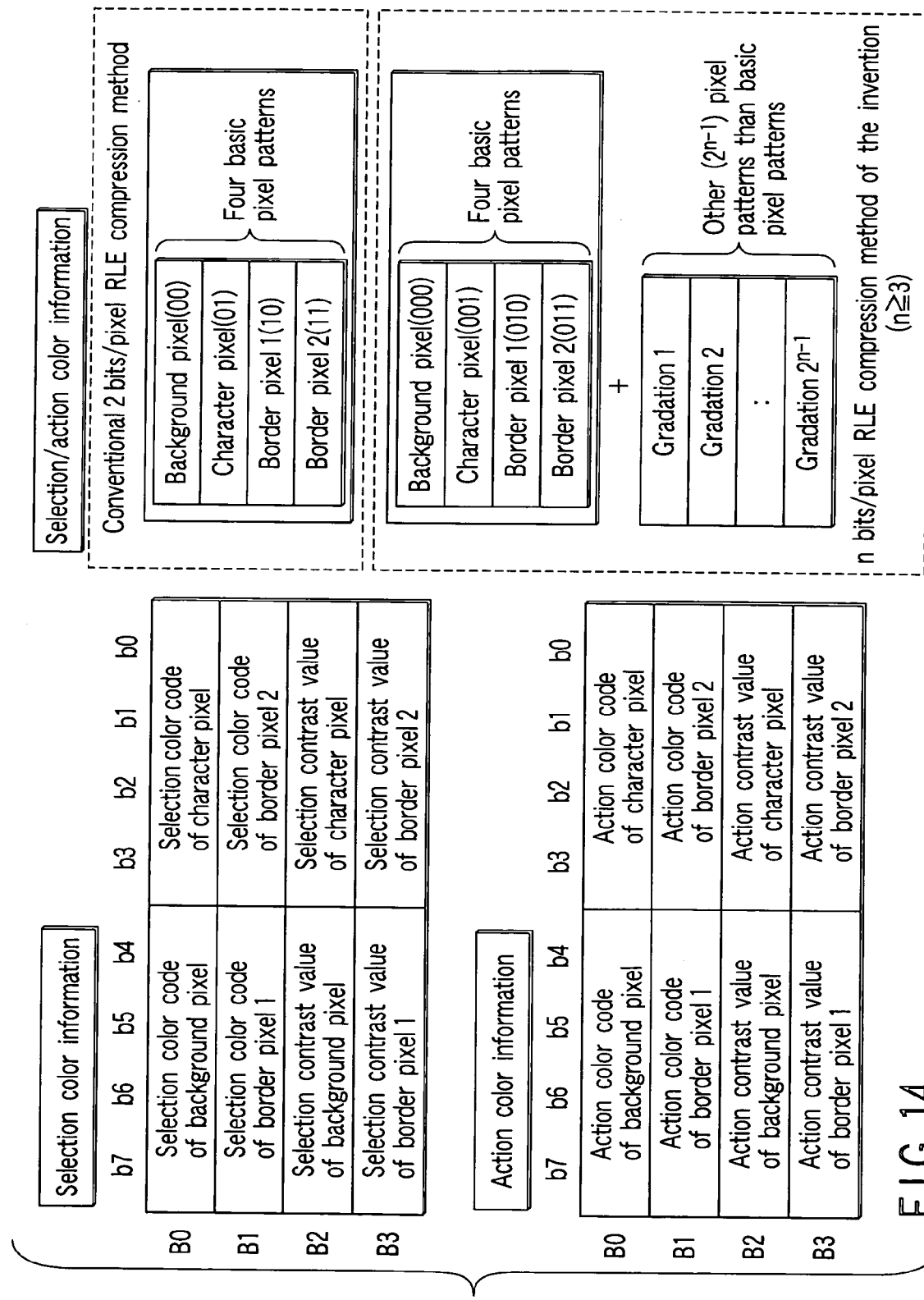
FIG. 14 is an exemplary diagram showing a data structure of selection color information and action color information in FIG. 13.

As shown in FIG. 14, the selection color information and the action color information in FIG. 13 respectively have the following 4-bit color code designation area and contrast value designation area.

<Selection color information>
Selection color code of background pixel
Selection color code of character pixel
Selection color code of border pixel 1
Selection color code of border pixel 2
Selection contrast value of background pixel
Selection contrast value of character pixel
Selection contrast value of border pixel 1
Selection contrast value of border pixel 2
<Action color information>
Action color code of background pixel
Action color code of character pixel
Action color code of border pixel 1
Action color code of border pixel 2
Action contrast value of background pixel
Action contrast value of character pixel
Action contrast value of border pixel 1
Action contrast value of border pixel 2

As shown in the lower right of FIG. 14, the run length compression is carried out separately for the four basic pixel patterns (background pixel, character pixel, border pixel 1 and border pixel 2), and $2^{n-1}$ gradation pixel patterns other than the basic pixel patterns in the n bits/pixel run length compression method ($n \geq 3$) of the invention. Therefore, as shown in the upper right of FIG. 14, the four basic pixel patterns (background pixel, character pixel, border pixel 1 and border pixel 2) in the conventional 2 bits/pixel run length compression method, and the four basic pixel patterns in the n bits/pixel run length compression method can be handled in the same manners. Therefore, the 4-bit areas of the selection color information and the action color information in the highlight information of the buttons configuring the menu screen can be shared, and the selection colors and action colors of the menu buttons may be changed.

Accordingly, contents developers can select highlight in the menu screen, by selecting either the sub-pictures of 2 bits/pixel, or the sub-pictures of further higher picture quality n bits/pixel, according to kinds of contents. Further, on the assumption of the case where high definition (HD) pictures are downconverted into standard definition (SD) pictures at a player side, both the sub-pictures may be recorded simultaneously into a disk. In this case, pixel data for highlight process can be set in common, and therefore, simplification of processes can be realized.

Figure 15:
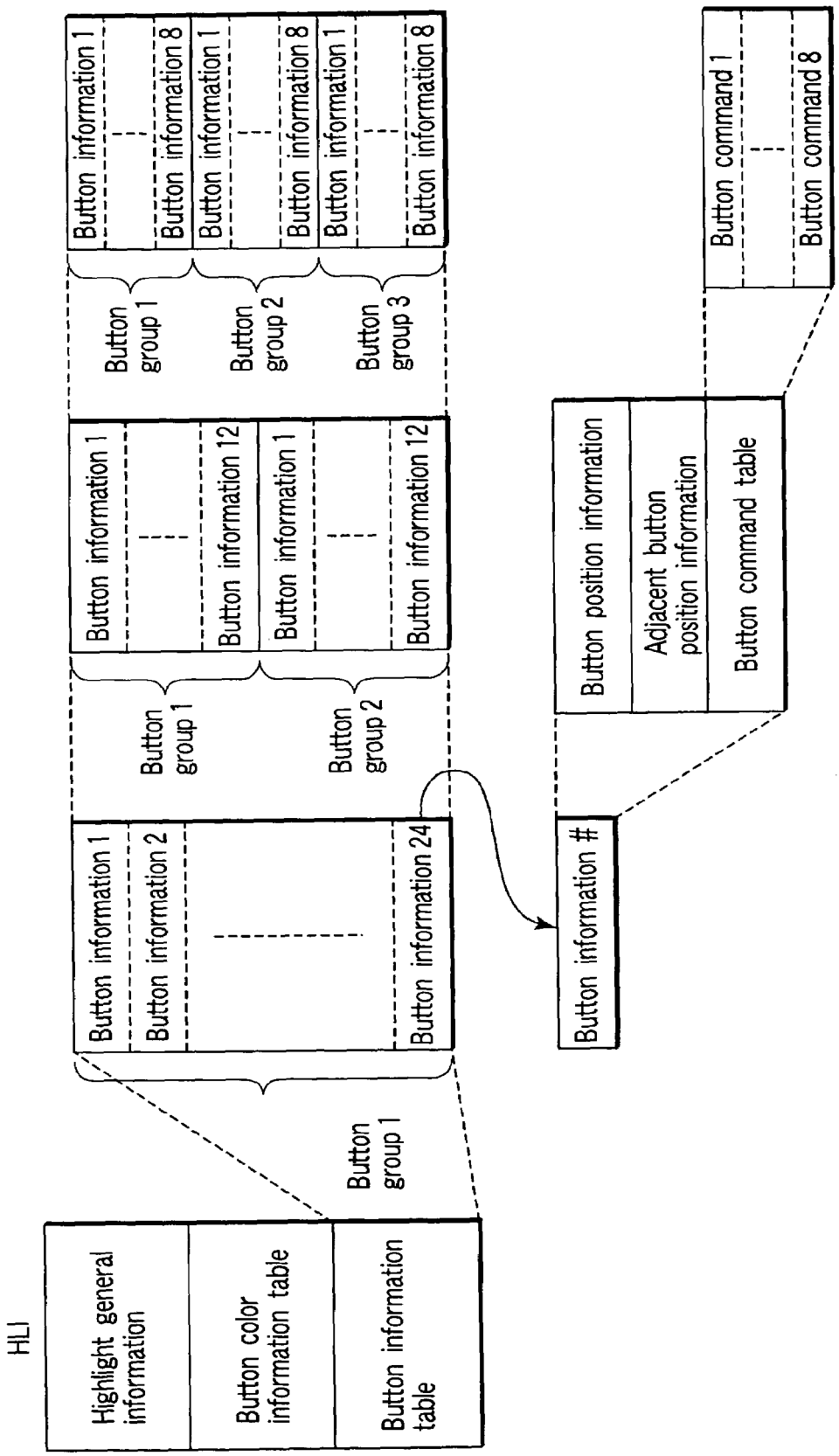
FIG. 15 is an exemplary diagram showing a data structure of a button information table in highlight information.

FIG. 15 shows the contents of the button information table. The button information table may be divided into button groups 1 to 3 for use, by button modes. When the button group number is 1, up to 24 buttons may be set. When the button group number is 2, 2 groups where up to 12 buttons can be arranged may be set. When the button group number is 3, 3 groups where up to 8 buttons can be arranged may be set.

Each button information includes button position information for arranging buttons on the menu screen, adjacent button position information showing movement availability with adjacent buttons, and a button command table where up to 8 commands can be performed after button action.

Since the above-mentioned highlight information is stored independently in the highlight information pack 322 shown in FIG. 2C, the highlight information (HLI) data 333 may be acquired easily, and it is possible to construct a system with easy highlight processing.

FIG. 16 shows an information recording device (information compressing device) for recording information into the optical disk 1 as an information storage medium.

Data to be input through video, audio, and sub-picture input terminals are converted from analog signals into digital signals by A/D converter units 421. Video data digital-converted by the A/D converter unit 421 is encoded by a video encoder unit 422. Sub-picture data digital-converted by the A/D converter unit 421 is encoded by a sub-picture encoder unit 423. Audio data digital-converted by the A/D converter unit 421 is encoded by an audio encoder unit 424. The video, audio, and sub-picture data encoded by the respective encoder units 422, 423, and 424 are packetized and packed, by a multiplexer (MUX) 425, and made into video packs, audio packs, and sub-picture packs that configure an MPEG2 program stream. At this moment, according to an instruction from an MPU unit 410, the highlight information stored in a memory unit 411 is packetized and packed by the multiplexer 425, and multiplexed as shown in FIG. 2C.

Reference numeral 426 is a file formatter unit which converts multiplexed data groups into files conforming to a file structure that can be recorded and reproduced by the present recording/reproducing device. Reference numeral 427 is a volume formatter unit which forms a data format conforming to a volume structure that can be recorded and reproduced by the present recording/reproducing device. Herein, data filed by the file formatter unit 426, reproduction control information for reproducing the filed data, and the like are added. Reference numeral 428 is a physical formatter for recording data into the optical disk 1. The above file formatter unit 426 and volume formatter unit 427 are logic formatters, and it is the disk formatter unit 428 that records the formatted data via a disk drive unit 401 into the optical disk 1. Further, reference numeral 420 is a ROM unit that stores a series of processing programs of the present recording/reproducing device, and the programs are executed by the MPU unit 410 under instructions from a key input unit 419.

FIG. 17 shows the basic flow chart in the case of performing encoding (compression) data in unit of line according to the run length compression rules of the embodiment. As shown in FIG. 17, the basic flow of compression comprises the following processes.

Acquisition process of acquiring the n-bit pixel-data PIX and detection process of counting continuous runs (step S41).

Determination process of determining whether or not the n-bit pixel data PIX conforms to the four basic pixel patterns, and selection process of selecting the encoding method therefor (step S42).

Output process of outputting the run continuation presence/absence flag COMP (step S43).

Output process of outputting the pixel data PIX (step S44).

Output process of outputting the run counter extension flag LEXT (step S45).

Output process of outputting the run counter and the run extension counter RUN (step S46).

Detection process of detecting the line end and output process of outputting the line end code (step S47).

Figure 18:
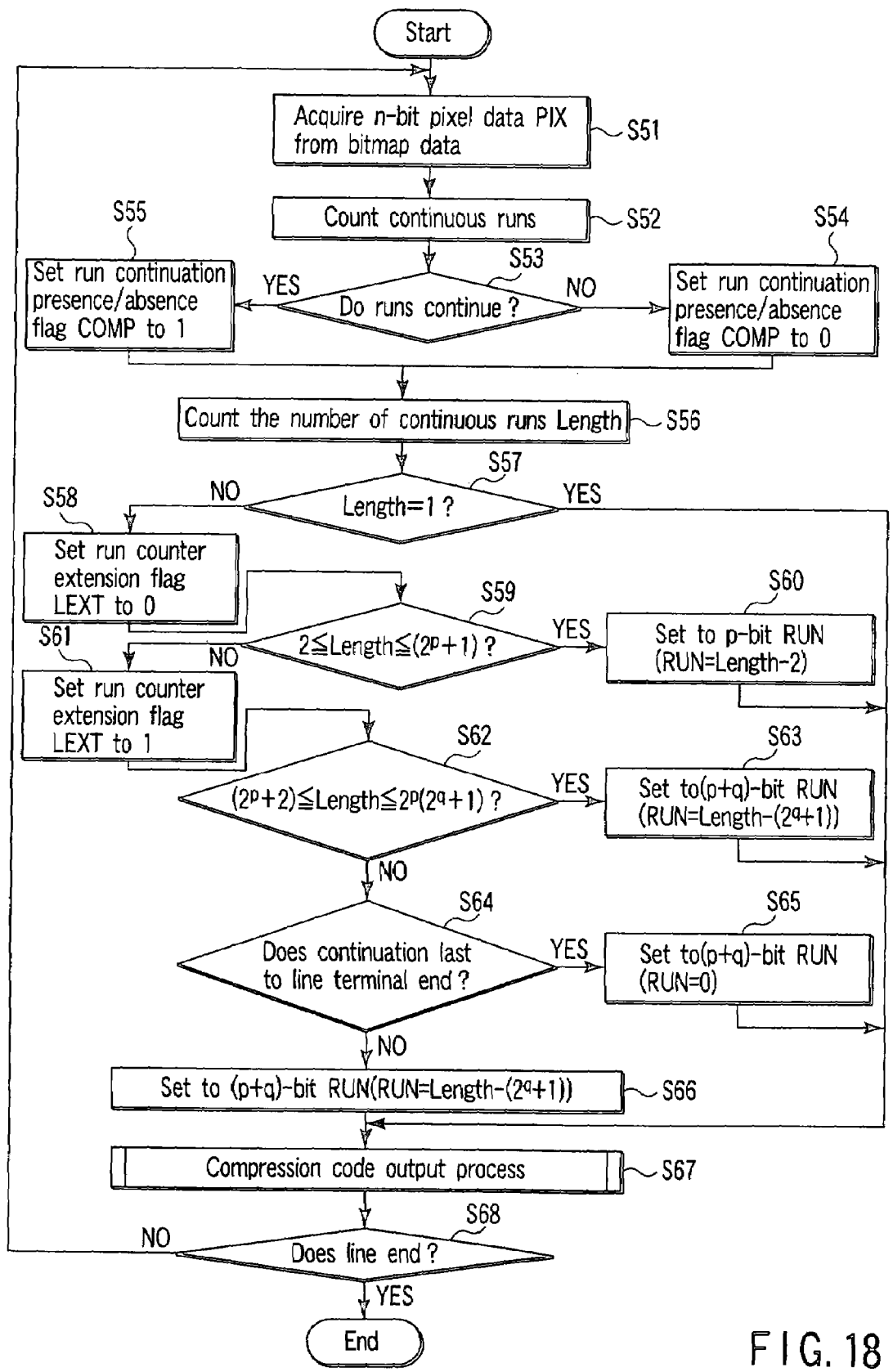
FIG. 18 is an exemplary flow chart showing detailed processes of run length compression.
Figure 19:
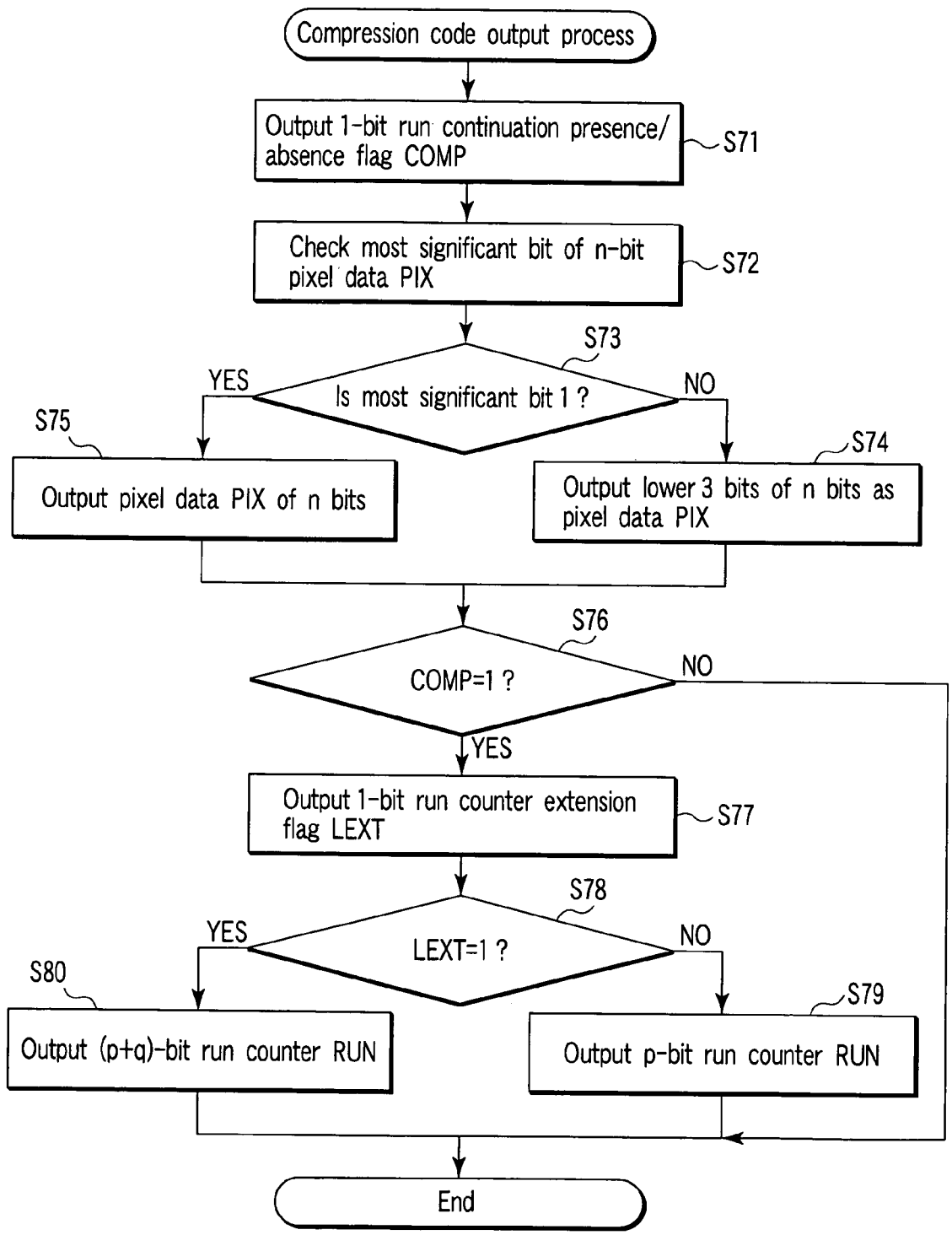
FIG. 19 is an exemplary flow chart showing detailed processes of compression code output process in FIG. 18.

FIGS. 18 and 19 show detailed flow charts of the flow chart shown in FIG. 17. FIG. 18 is the main flow, and the flow comprises the following processes.

The n-bit pixel data PIX is acquired from n bits/pixel bitmap data as an original image (step S51). When n is 8, the gradation pixel is as shown in FIG. 5C, and five significant bits (all 0) are added to the basic pixel shown in FIG. 5C.

Continuous runs are counted (step S52).

It is determined whether or not runs continue (step S53).

If the determination result is false (NO) in step S53, the run continuation presence/absence flag COMP is set to 0 (step S54).

If the determination result is true (YES) in step S53, the run continuation presence/absence flag COMP is set to 1 (step S55).

The number of continuous runs Length is counted (step S56).

The value of the number of continuous runs is checked. It is determined whether or not the value of Length is equal to 1 (step S57).

If the determination result is false (NO) in step S57, the run counter extension flag LEXT is set to 0 (step S58).

If the determination result is true (YES) in step S57, the compression code output process of step S67 is performed.

It is determined whether or not the value of Length is 2 or more and ($2^p+1$) or less (step S59).

If the determination result is true (YES) in step S59, (Length−2) is set to the p-bit run counter RUN (step S60).

If the determination result is false (NO) in step S59, the run counter extension flag LEXT is set to 1 (step S61).

It is determined whether or not the value of Length is ($2^p+2$) or more and $2^p(2^q+1)$ or less (step S62).

If the determination result is true (YES) in step S62, (Length−($2^p+1$)) is set to the (p+q)-bit run counter RUN (step S63).

If the determination result is false (NO) in step S62, it is determined whether or not the continuation lasts to the line terminal end (step S64).

If the determination result is true (YES) in step S64, 0 is set to all the bits of the (p+q)-bit run counter RUN (step S65).

If the determination result is false (NO) in step S64, (Length−($2^p+1$)) is set to the (p+q)-bit run counter RUN (step S66).

The compression code output process is performed (step S67).

It is determined whether or not the line ends (step S68).

If the determination result is false (NO) in step S68, the process goes back to step S51, and the compression process is continued.

If the determination result is true (YES) in step S68, the compression process of one line is completed.

FIG. 19 is a detailed flow of the compression code output process flow (step S67 in FIG. 18), and the flow comprises the following process.

The 1-bit run continuation presence/absence flag COMP is output (step S71).

The most significant bit of the n-bit pixel data PIX is checked (step S72).

It is determined whether or not the most significant bit is 1 (step S73).

If the determination result is false (NO) in step S73, only the lower three bits of n bits are output as the pixel data PIX (step S74).

If the determination result is true (YES) in step S73, all of the pixel data PIX of n bits is output (step S75).

The run continuation presence/absence flag COMP is checked. It is determined whether or not the run continuation presence/absence flag COMP is 1 (step S76).

If the determination result is false (NO) in step S76, the process is ended.

If the determination result is true (YES) in step S76, the 1-bit run counter extension flag LEXT is output (step S77).

The run counter extension flag LEXT is checked. It is determined whether or not the run counter extension flag LEXT is 1 (step S78).

If the determination result is false (NO) in step S78, the p-bit run counter RUN is output (step S79), and the process is ended.

If the determination result is true (YES) in step S78, (p+q)-bit run counter RUN is output (step S60), and the process is ended.

As described above, according to the embodiment of the invention, the basic data structure comprises the run continuation presence/absence flag COMP, the pixel data PIX, the run counter extension flag LEXT, and the run counter and/or the run extension counter RUN. In addition, short bit lengths are allocated to the four basic patterns that appear frequently in the subtitle application of the sub-picture, whereby the data size is restricted from increasing, and run length compression can be realized. Specifically, it is possible to provide an information recording medium, an information recording device, an information reproducing device and an information reproducing method having the following features.

(1) Since highlight information is recorded in the video object unit as a highlight information pack, data acquisition and highlight processing can be improved.

(2) In the expression of n bits/pixel or higher, short bit lengths are allocated to the basic pixel patterns that appear frequently in a predetermined application, whereby the data size is restricted from increasing, and run length compression with a high compression ratio can be realized in which run length can be made long enough even in 128 colors or more.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording device comprising:
    a determination unit which determines whether or not pixel data conforms with basic pixel patterns based on a most significant bit of the pixel data;
    a pixel data output unit which outputs a predetermined number of lower bits of the pixel data when the pixel data conforms with the basic pixel patterns, and outputs the pixel data as it is when the pixel data does not conform with the basic pixel patterns;
    a run counter output unit which outputs a run counter according to a number of continuous runs of the pixel data; and
    a recording unit which records into a recording medium a run length compression code composed of the run counter output by the run counter output unit and the pixel data output by the pixel data output unit.

2. An information recording device according to claim 1, further comprising:
    a compression flag output unit which outputs a compression flag indicating whether the number of continuous runs of the pixel data is 1 or not prior to an output of the pixel data;
    an extension flag output unit which outputs a counter extension flag which follows the pixel data; and
    an extension counter output unit which, when the number of continuous runs of the pixel data is a predetermined number or more, outputs an extension counter which follows the run counter, wherein
    the recording unit records a run length compression code composed of the pixel data, the run counter, the counter extension flag, and the extension counter.

3. An information reproducing method comprising the following steps:
    reading a compression flag indicating whether the number of continuous runs of pixel data is 1 or not prior to an output of pixel data;
    determining whether or not pixel data conforms with basic pixel patterns based on a bit which follows the compression flag;
    reading data of a first number of bits which follow the compression flag as the pixel data when the pixel data conforms with the basic pixel patterns, and reading data of a second number of bits which is larger than the first number of bits which follow the compression flag as the pixel data when the pixel data does not conform with the basic pixel patterns;
    when the pixel data conforms with the basic pixel patterns, adding a predetermined number of bits as higher bits to the read pixel data to be the pixel data of the second number of bits;
    when the number of continuous runs is not 1, reading a run counter and/or an extension counter according to a value of a counter extension flag which follows the pixel data; and
    outputting the pixel data continuously according to the value of the run counter and/or the extension counter.

* * * * *